US012111198B2

(12) United States Patent
Merle et al.

(10) Patent No.: US 12,111,198 B2
(45) Date of Patent: Oct. 8, 2024

(54) DETECTION OF EVENT-BASED STATES DURING A FILL LEVEL MEASUREMENT

(71) Applicant: Endress+Hauser SE+Co. KG, Maulburg (DE)

(72) Inventors: Jens Merle, Schopfheim (DE); Alexey Malinovskiy, Maulburg (DE); Stefan Gorenflo, Hausen (DE); Markus Vogel, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 612 days.

(21) Appl. No.: 17/278,813

(22) PCT Filed: Aug. 19, 2019

(86) PCT No.: PCT/EP2019/072075
§ 371 (c)(1),
(2) Date: Mar. 23, 2021

(87) PCT Pub. No.: WO2020/064216
PCT Pub. Date: Apr. 2, 2020

(65) Prior Publication Data
US 2022/0034700 A1 Feb. 3, 2022

(30) Foreign Application Priority Data
Sep. 24, 2018 (DE) ...................... 10 2018 123 432.5

(51) Int. Cl.
*G01F 23/284* (2006.01)
(52) U.S. Cl.
CPC .................. *G01F 23/284* (2013.01)

(58) Field of Classification Search
CPC ..................................................... G01F 23/284
(Continued)

(56) References Cited

U.S. PATENT DOCUMENTS 4,958,295 A * 9/1990 Davidson ............. G01N 35/085
422/82
7,117,108 B2 * 10/2006 Rapp ..................... A61B 5/7264
600/509

(Continued)

FOREIGN PATENT DOCUMENTS

DE 4332071 A1 3/1995
DE 10360711 A1 7/2005
(Continued)

*Primary Examiner* — Nuzhat Pervin
(74) *Attorney, Agent, or Firm* — Mark A. Logan; Endress+Hauser (USA) Holding, Inc.

(57) ABSTRACT

Disclosed is a method for detecting an event-based state, such as foam formation or a working stirring mechanism in a container during a radar-based measurement of a fill level of a filler located in a container. The method includes: generating an analysis curve and detecting a specified characteristic value of the analysis curve within at least one specified sub-region of the measurement region. The characteristic value can be the amplitude of a local maximum or the area under the analysis curve for example. A change or a dispersion of the characteristic value is ascertained over proceeding measurement cycles. The fill level measuring device detects the event-based state if the change or the dispersion exceeds a corresponding threshold. Thus, the occurrence of different events in the container can be imparted to a system controller automatically and without additional measurement instruments.

3 Claims, 2 Drawing Sheets

(58) Field of Classification Search
USPC .......................................................... 342/124
See application file for complete search history.

(56) References Cited

U.S. PATENT DOCUMENTS

| | | | | |
|---|---|---|---|---|
| 7,284,425 B2* | 10/2007 | Wennerberg | .......... | G01F 23/284 |
| | | | | 73/290 V |
| 7,355,548 B2* | 4/2008 | Larsson | ................ | G01F 23/284 |
| | | | | 73/290 R |
| 7,965,087 B2* | 6/2011 | Reimelt | ................ | G01S 7/2921 |
| | | | | 73/1.73 |
| 8,276,444 B2* | 10/2012 | Malinovskiy | ....... | G01F 23/2962 |
| | | | | 73/620 |
| 9,128,181 B2* | 9/2015 | Wegemann | ........... | G01S 13/343 |
| 9,778,089 B2* | 10/2017 | Edvardsson | ............ | G01S 7/292 |
| 9,891,185 B2* | 2/2018 | Feldman | ............ | G01N 27/3271 |
| 10,489,263 B2* | 11/2019 | Grimm | ..................... | B65C 9/40 |
| 10,517,479 B2* | 12/2019 | Tran | ........................ | A61B 7/045 |
| 11,280,728 B2* | 3/2022 | Bauer | .................... | G01N 21/55 |
| 2003/0033869 A1* | 2/2003 | Laun | .................. | G01F 23/2965 |
| | | | | 73/290 V |
| 2003/0136173 A1* | 7/2003 | Elenich | .................. | G01F 9/001 |
| | | | | 73/1.73 |
| 2004/0243328 A1* | 12/2004 | Rapp | .................... | A61B 5/7264 |
| | | | | 702/71 |
| 2008/0143583 A1* | 6/2008 | Welle | .................... | G01S 7/4008 |
| | | | | 342/124 |
| 2012/0158363 A1* | 6/2012 | Hammer | .................. | G01D 3/10 |
| | | | | 702/183 |
| 2012/0324994 A1* | 12/2012 | Welle | .................... | G01F 23/284 |
| | | | | 73/290 R |
| 2013/0063298 A1* | 3/2013 | Gorenflo | ............... | G01F 23/284 |
| | | | | 342/124 |
| 2014/0298100 A1* | 10/2014 | Grimm | ............... | G06F 11/3409 |
| | | | | 714/37 |
| 2017/0211963 A1* | 7/2017 | Taheri | ....................... | G01S 7/03 |
| 2018/0149474 A1* | 5/2018 | Tixier | .................. | G01F 23/284 |

FOREIGN PATENT DOCUMENTS

| | | | | |
|---|---|---|---|---|
| DE | 112006002310 T5 | | 7/2008 | |
| DE | 102012104858 A1 | * | 12/2013 | ......... G01F 23/0061 |
| DE | 102017100269 A1 | * | 7/2018 | .......... G01F 23/284 |
| EP | 2418465 A1 | | 2/2012 | |
| EP | 2550509 B1 | * | 7/2016 | ............. G01D 21/00 |
| WO | WO-2012143252 A1 | * | 10/2012 | ............... B29C 49/78 |

* cited by examiner

DETECTION OF EVENT-BASED STATES DURING A FILL LEVEL MEASUREMENT

CROSS-REFERENCE TO RELATED APPLICATIONS

The present application is related to and claims the priority benefit of German Patent Application No. 10 2018 123 432.5, filed on Sep. 24, 2018 and International Patent Application No. PCT/EP2019/072075, filed on Aug. 19, 2019, the entire contents of which are incorporated herein by reference.

TECHNICAL FIELD

The invention relates to a method for detecting an event-based state by means of a radar-based fill-level measuring device, and also to a fill-level measuring device for carrying out said method.

BACKGROUND

In process automation technology, field devices for capturing or modifying process variables are generally used. For this purpose, the functioning of the field devices is in each case based on suitable measuring principles in order to capture the corresponding process variables, such as fill level, flow rate, pressure, temperature, pH value, redox potential or conductivity. A wide variety of such field devices is manufactured and distributed by the Endress+Hauser company.

For measuring the fill level of fillers in containers, radar-based measuring methods have become established since they are robust and require minimum maintenance. Within the scope of the invention, the term "container" also refers to containers that are not closed, such as basins, lakes, or flowing bodies of water. A key advantage of radar-based measuring methods lies in their ability to measure the fill level quasi-continuously. In the context of this patent application, the term "radar" refers to signals or electromagnetic waves having frequencies between 0.03 GHz and 300 GHz. Typical frequency bands in which fill-level measurement is carried out are 2, 6 GHz, 26 GHz or 78 GHz.

In the case of radar-based fill-level measurement, the pulse time-of-flight principle is an established measuring principle. Here, pulse-shaped microwave signals are emitted cyclically in the direction of the filler and the time of flight until reception of the corresponding pulse-shaped receive signal is measured. On the basis of this measuring principle, fill-level measuring devices can be realized with comparatively low circuitry complexity. A radar-based fill-level measuring device which operates according to the time-of-flight method is described, for example, in the unexamined patent application DE 10 2012 104 858 A1.

If a more complex circuit technology can be accepted, FMCW (frequency-modulated continuous wave) is a possible measuring principle for radar-based fill-level measurement. For a typical construction of FMCW-based fill-level measuring devices, reference is made by way of example to the unexamined patent application DE 10 2013 108 490 A1.

The measuring principle in FMCW radar-based distance measuring methods is based on emitting the microwave signal continuously but with a modulated frequency. Here, the frequency of the microwave signal lies within a defined frequency band in the range of a standardized center frequency. Characteristic of FMCW is here that the transmission frequency is not constant but changes periodically within the defined frequency band. The change over time is linear as standard in this case and has a sawtoothed or triangular shape. However, a sinusoidal change can in principle also be used. In contrast to the pulse time-of-flight method, the distance or the fill level when implementing the FMCW method is determined on the basis of the instantaneous frequency difference between the current receive signal and the just emitted microwave signal.

In addition to freely radiating radar measurement, in which the microwave signal is emitted or received via an antenna, the variant of guided radar also exists independently of the pulse time-of-flight method or FMCW. In this case, the microwave signal is guided via an electrically conductive probe (for example, a coaxial cable or a metal rod) which is lowered into the container. At the location of the filler surface, the receive signal is generated in the probe and reflected along the probe toward the fill-level measuring device. This variant of radar-based fill-level measurement is also known by the term TDR (time-domain reflectometry). This variant is advantageous in that due to the guided signal radiation, less power is required for operating the fill-level measuring device.

For each of the aforementioned measuring principles (pulse time-of-flight and FMCW; independent of guided or free emission), a corresponding analysis curve is recorded to ascertain the fill level on the basis of the receive signal. In the case of the pulse radar-based method, due to the high pulse frequency, the analysis curve is generated by undersampling the reflected receive signal. As a result, the analysis curve represents the actual reflected receive signal in a time-expanded way. When implementing the FMCW method, the analysis curve is generated by mixing the just transmitted microwave signal with the reflected receive signal. Regardless of the measuring principle, the analysis curve reflects the amplitude of the reflected receive signal as a function of the measuring distance.

The fill level is determined from the analysis curve by detection and local assignment of the corresponding local maximum. In the ideal case, there is no further maximum besides the maximum that is generated by the filler surface. Due to further reflecting surfaces inside the container, further corresponding maxima appear in the analysis curve in practice in addition to the fill-level maximum. However, only the maximum which is generated by the filler surface is relevant to fill-level measurement. Further information in the analysis curve is therefore filtered out if possible in order to make the fill-level measurement more reliable.

SUMMARY

Depending on the process plant, it may be advantageous during the course of fill-level measurement to detect further events, such as foam or deposits forming in the container, in order to possibly be able to counteract such events. The object of the invention is therefore to provide a fill-level measuring device with which not only the fill level but also further properties or states can be detected in connection with fill-level measurement.

The invention achieves this object by a method for detecting an event-based state by means of a radar-based fill-level measuring device which is used to measure a fill level of a filler located in a container. The method comprises the following method steps, which are repeated in successive measurement cycles:

emitting a microwave signal in the direction of the filler,
receiving a receive signal after reflection of the microwave signal inside the container, generating an analysis curve on the basis of at least the receive signal, the analysis curve being generated in such a way that a signal strength of the receive signal is reproduced as a function of the measuring distance, detecting a specified characteristic value of the analysis curve within the measurement region or at least one specified sub-region of the measurement region.

A change and/or a dispersion of the characteristic value is ascertained according to the invention over proceeding measurement cycles. Here, the event-based state is detected if the change or dispersion exceeds a specified threshold.

Within the context of the invention, an event-based state is associated with the occurrence of a specific state during the course of fill-level measurement. This can be, for example, the stirring of a stirring mechanism, the formation of foam or deposits in the container. When such an event-based state is detected by the fill-level measuring device, this information can thus be transmitted to the process system controller, for example, in order to output corresponding control commands based thereon, such as turning off a heater or turning off a stirring mechanism.

An event-based state according to the invention may, however, also be the occurrence of a malfunction in the fill-level measuring device itself. Depending on the type of event-based state, the occurrence of this state can therefore also be associated with the fact that the fill-level value detected by the fill-level measuring device is inaccurate or not reliable. The reason for this can be, for example, an antenna of the fill-level measuring device 1 affected by deposits. Even if such a state is present, it can again be transmitted to the higher-level unit in order, for example, to output a corresponding warning.

The solution according to the invention thus offers the advantage that the occurrence of various events in the container can be communicated to the system controller in an automated manner and without additional measurement instruments. The operational reliability of the entire process plant can thus be increased.

The characteristic value from which the analysis curve is detected can be defined in various ways within the scope of the invention. On the one hand, the area under the analysis curve can be detected as a characteristic value at least in a sub-region of the measurement region. With such a definition, it is possible, for example, to determine the power of the receive signal reflected from this sub-region. An increase in the area or power with increasing measurement cycles to beyond a threshold defined for this purpose occurring in the sub-region that adjoins the antenna can be interpreted, for example, as a build-up of deposits on the antenna. A decrease in power in a more distant sub-region to below a corresponding threshold can be caused by foam formation.

The amplitude, in particular a local maximum, can be detected as a characteristic value in the analysis curve as an alternative or in addition to the area. A variance in amplitude which is greater than a specified threshold can be interpreted, for example, as a rotating stirring mechanism, provided the sub-region to be observed is at the same height as the stirring mechanism.

A third possibility for defining the characteristic value consists in detecting as characteristic value the number of local maxima in at least one sub-region of the measurement region. Exceeding a threshold with regard to the number of maxima can, for example, be interpreted, depending on the type of filler, as the appearance of disruptive bodies, such as deposits on the inner wall of the container.

Analogously to the method according to the invention, the object on which the invention is based is also achieved by a radar-based fill-level measuring device, which is suitable for carrying out the method according to at least one of the aforementioned embodiment variants. Accordingly, it comprises the following components:

a signal generating unit designed to respectively emit a microwave signal in the direction of the filler in successive measurement cycles, a receiving unit designed to receive a receive signal after reflection of the microwave signal inside the container, an evaluation unit designed to generate, on the basis of at least the receive signal, per measurement cycle, an analysis curve representing a signal strength of the receive signal as a function of the measuring distance, to detect a specified characteristic value of the analysis curve within at least one defined sub-region of the measurement region, to ascertain a change and/or a dispersion of the characteristic value over proceeding measurement cycles, to detect the event-based state if the change or dispersion exceeds a specified threshold, to determine the fill level by means of the analysis curve at least if the change or dispersion does not exceed a specified threshold.

Within the context of the invention, the term "unit" is understood to mean in principle any electronic circuit that is designed to be suitable for its intended purpose. Depending on the requirement, it can therefore be an analog circuit for generating or processing corresponding analog signals. However, it can also be a (semiconductor-based) digital circuit, such as an FPGA or a storage medium in interaction with a program. In this case, the program is designed to carry out the corresponding method steps or to apply the necessary calculation operations of the unit in question. In this context, various electronic units of the fill-level measuring device in the sense of the invention can potentially also access a common physical memory or be operated by means of the same physical digital circuit.

In a further embodiment of the fill-level measuring device, the evaluation unit can preferably be designed such that if the threshold is exceeded or undershot, the occurrence of the specific event state is output, in particular graphically or as an electrical signal. A corresponding electrical signal can be transmitted to the system controller by means of a suitable bus system, for example. It is also possible, depending on the definition of the event-based state, to design the fill-level measuring device such that, if the change or dispersion exceeds or undershoots the specified threshold, no new fill-level value is determined from the current analysis curve.

In addition, it is advantageous if the sub-region for detecting the characteristic value can be configured manually at the fill-level measuring device. The fill-level measuring device can thus be adapted to the particular container or to the particular filler. For example, if the antenna is prone to the build-up of deposits due to filler containing dust or due to damp filler, the sub-region can be manually placed in the location of the measurement region adjacent to the antenna. If a stirring mechanism is present in the center of the container or of the measurement region, the sub-region in which the characteristic value is to be ascertained can be placed at this location in the measurement region.

BRIEF DESCRIPTION OF THE DRAWINGS

The invention is explained in more detail with reference to the following figures. The following is shown.

DETAILED DESCRIPTION

Figure 1:
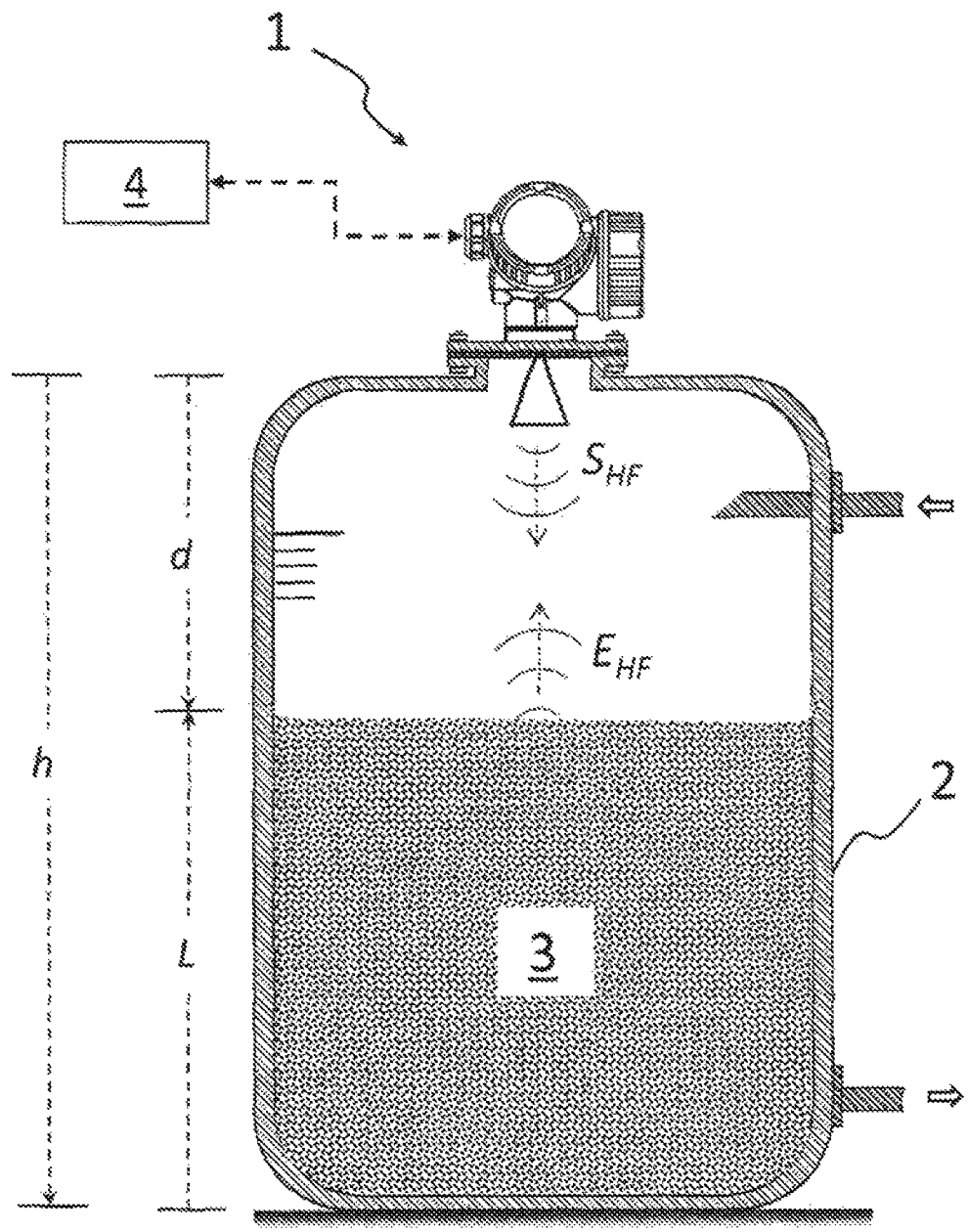
FIG. 1 shows an arrangement of a radar fill-level measuring device.

For understanding the invention, FIG. 1 shows a typical arrangement of a freely radiating radar-based fill-level measuring device 1 on a container 2. In the container 2 is a filler 3, whose fill level L is to be determined by the fill-level measuring device 1. For this purpose, the fill-level measuring device 1 is mounted on the container 2 above the maximum permissible fill level L. Depending on the field of application, the installation height h of the fill-level measuring device 1 above the container bottom can be more than 100 m.

As a rule, the fill-level measuring device 1 is connected via a bus system, such as "Ethernet," "PROFIBUS," "HART" or "Wireless HART," to a higher-level unit 4, such as a process control system or a decentralized database. On the one hand, information about the operating status of the fill-level measuring device 1 can thus be communicated. On the other hand, information about the fill level L can also be transmitted in order to control any inflows and/or outflows that may be present at the container 2. Since the fill-level measuring device 1 shown in FIG. 1 is designed as freely radiating radar, it comprises a corresponding antenna. As indicated, the antenna can be designed as a horn antenna, for example. Especially in the case of radar frequencies above 100 GHz, the antenna can also be realized as a planar antenna. Regardless of the design, the antenna is oriented in such a way that corresponding microwave signals $S_{HF}$ are emitted in the direction of the filler 3.

The microwave signals $S_{HF}$ are reflected at the surface of the filler 3 and, after a corresponding signal time-of-flight, are correspondingly received as receive signals $E_{HF}$ at the antenna of the fill-level measuring device 1. In this case, the signal time-of-flight of the microwave signals $S_{HF}$, $E_{HF}$ depends on the distance d=h−L of the fill-level measuring device 1 from the filler surface.

The filler 3 often undergoes a chemical reaction, a grinding process or a stirring process during fill-level measurement. In contrast to the illustration shown in FIG. 1, the filler 3 therefore may have a foaming filler surface. Due to high temperatures or a dusty atmosphere, deposits can also form on the inner wall of the container or on the antenna. Accordingly, such states in the course of fill-level measurement can lead to an inaccurate or incorrect fill-level value L being ascertained. For operating the process plant, it is therefore advantageous to be able to recognize the individual states in order to, in the simplest case, stop a chemical reaction, for example in the event of unwanted foam formation, by stopping an inflow or by turning down a heating system.

According to the invention, such states can, depending on the event, be recognized with the aid of the analysis curve $ZF_1$, $ZF_n$ generated by the fill-level measuring device 1. The fill-level measuring device 1 generates the analysis curve $ZF_1$, $ZF_n$ when implementing the FMCW method in principle by mixing the just received receive signal $E_{HF}$ with the microwave signal $S_{HF}$ currently being emitted, wherein the microwave signal $S_{HF}$ is for this purpose emitted continuously and within the frequency band with a sawtoothed frequency change.

In the case of the pulse time-of-flight method, the analysis curve $ZF_1$, $ZF_n$ is generated by undersampling the pulsed receive signal $E_{HF}$, wherein the pulse frequency of the sampling signal for this purpose differs slightly from the pulse frequency of the microwave signal $S_{HF}$ or of the receive signal $E_{HF}$.

In the case of both FMCW and the pulse time-of-flight method, the analysis curve $ZF_1$, $ZF_n$ represents the signal amplitude A of the receive signal $E_{HF}$ as a function of the measuring distance d. In the case of fill-level measurement, the corresponding measurement region h extends accordingly from the antenna of the fill-level measuring device 1 to the bottom of the container 2. The fill level L can be ascertained by the fill-level measuring device 1 on the basis of the analysis curve $ZF_1$, $ZF_n$, since the reflection of the microwave signal $S_{HF}$ at the filler surface generates a local maximum $A_{m,1}$, $A_{m,n}$ in the analysis curve $ZF_1$, $ZF_n$. Since the fill-level measuring device 1 is designed to ascertain the corresponding distance d from the local maximum $A_{m,1}$, $A_{m,n}$, the fill-level measuring device 1 can calculate the fill level L therefrom.

Figure 2:
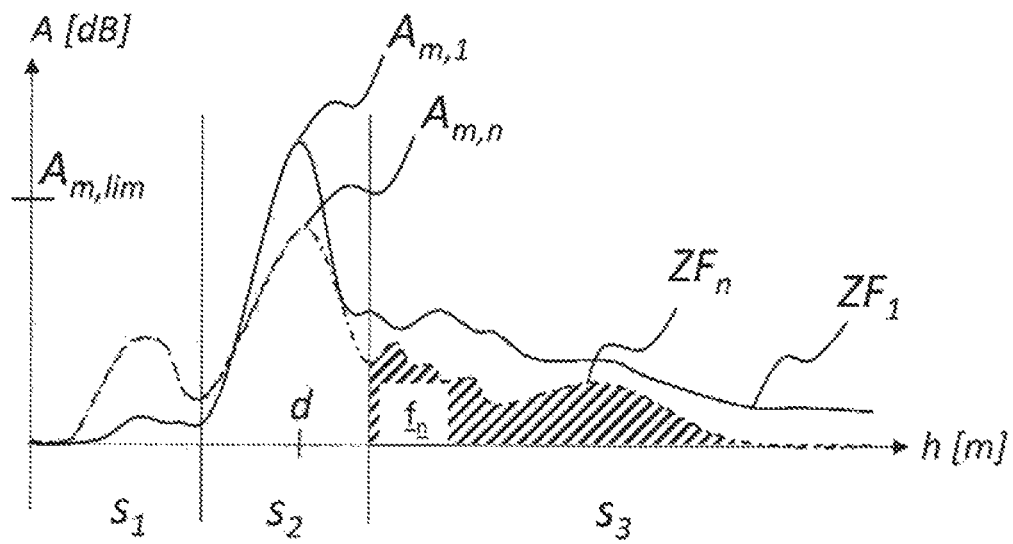
FIG. 2 shows a circuit technology structure of the fill-level measuring device.

In FIG. 2, two analysis curves $ZF_1$, $ZF_n$, which are recorded in a first measurement cycle 1 and also in a later measurement cycle n, are shown schematically. The method according to the invention for detecting possible event-based states is illustrated in more detail on the basis of these two analysis curves $ZF_1$, $ZF_n$: As can be seen, the measurement region h in the present case is divided into three sub-regions $s_1$, $s_2$, $s_3$, in which the first sub-region $s_1$ adjoins the antenna of the fill-level measuring device 1. The third sub-region $s_3$ is adjacent the bottom of the container. In the second, central sub-region $s_2$, the analysis curves $ZF_1$, $ZF_n$ at measuring distance d, which corresponds to the filler surface, respectively have a reflection maximum with corresponding amplitudes $A_{m,1}$, $A_{m,n}$. The fill-level measuring device 1 uses this maximum to determine the fill level L.

According to the invention, for the detection of event-based states, the effect is used that with proceeding measurement cycles n, the analysis curve $ZF_1$, $ZF_n$ changes at least in individual sub-regions $s_1$, $s_2$, $s_3$. A reduction in the area $f_n$ toward proceeding measurement cycles n, as visualized in the third sub-region $s_3$ of the analysis curve $ZF_n$, can be caused, for example, by foam formation of the filler 3. According to the invention, in this event state, the area $f_n$ in the third sub-region $s_3$ under the analysis curves $ZF_1$, $ZF_n$ can be defined as a characteristic value, wherein the possible change in the area $f_n$ in this sub-region $s_3$ with proceeding measurement cycles n is additionally ascertained by the fill-level measuring device 1. If a previously defined minimum area is undershot as a threshold, the fill-level measuring device 1 can deduce therefrom that foam formation has occurred as a specific event-based state. In this connection, it is appropriate according to the invention to design the fill-level measuring device 1 in such a way that the number and the respective position of the sub-regions $s_1$, $s_2$, $s_3$ can be adapted manually to the respective container 2 or the filler 3.

In addition to the area $f_n$, the amplitude $A_{m,1}$, $A_{m,n}$ of the fill-level maximum can also be used as the characteristic value: An undershooting of the amplitude $A_{m,n}$ to below a specified minimum amplitude $A_{m,min}$ can be assigned, for example, to foam formation as an event-based state. Other causes for an attenuation of the amplitude $A_{m,1}$, $A_{m,n}$ of the fill-level maximum may lie, for example, in the boiling of the filler 3 or in a change in the dielectric value of the filler 3.

As an alternative to the area $f_n$ or the amplitude $A_{m,1}$, $A_{m,n}$, the number of maxima (in the third sub-region $s_3$) can also be used as a characteristic value for monitoring over the measurement cycles n. A reduction in the number of peripheral maxima in the analysis curve $ZF_1$, $ZF_n$ with increasing measurement cycles n can again be interpreted by the fill-level measuring device 1 as foam formation.

On the other hand, an area or amplitude of the analysis curve $ZF_1$, $ZF_n$ in the first sub-region $s_1$ that increases with the measurement cycles n can, provided this area is defined as a characteristic value to be monitored, be detected by the fill-level measuring device 1 as build-up of deposits on the antenna if a corresponding threshold is exceeded.

Figure 3:
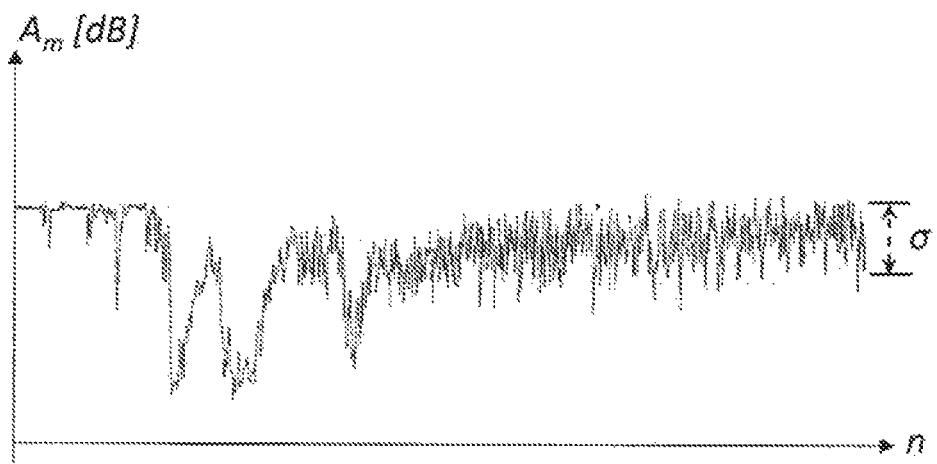
FIG. 3 shows an analysis curve according to the present disclosure.

Not only a change in a possible characteristic value but also its dispersion σ over past measurement cycles n can be used according to the invention to detect an event-based state. This is illustrated by way of example on the basis of the dispersion σ of the amplitude $A_m$ of the fill-level maximum in FIG. 3. In this case, the term "dispersion" is not restricted to a special mathematical definition, such as variance or the mean square deviation. If the fill-level measuring device 1 ascertains as a characteristic value a dispersion σ of the amplitude, which again lies above a predetermined threshold, the fill-level measuring device 1 can detect, for example, the operation of a stirring mechanism inside the container 2 as an event-based state. Conversely, undershooting the dispersion σ can be interpreted by the fill-level measuring device 1 as failure of the stirring mechanism.

Depending on how high the threshold for dispersion σ is selected, if the dispersion σ is exceeded, a foam formation can again be assigned as an event-based state. It goes without saying that, in addition to the amplitude $A_{m,1}$, $A_{m,n}$, the dispersion σ of other characteristic values, such as the dispersion of the area $f_n$ over preceding measurement cycles n, can also be ascertained.

If the fill-level measuring device 1 detects one of the possible event-based states, it can use this on the one hand to declare the fill-level value L ascertained from the analysis curve $ZF_1$, $ZF_n$ to be an untrustworthy incorrect measurement or to delete it.

On the other hand, if an event-based state is detected, the fill-level measuring device 1 can transmit it to the higher-level unit 4. This makes it possible, if appropriate, to react to the event-based state, for example by switching off a pump or a heating system in the process plant. For this purpose, the fill-level measuring device 1 must be designed to output a corresponding electrical signal by means of a suitable bus protocol in the event of an event-based state. Of course, if the fill-level measuring device 1 has a display or other (light) indicator, it can also be possible to display an event-based state graphically.

The invention claimed is:

1. A method for detecting a foaming of a filling material in a container with a radar-based fill-level measuring device that serves for measuring a fill level of the filling material in the container, the method comprising the following method steps which are repeated in successive measurement cycles:
    emitting a microwave signal in a direction of the filling material;
    receiving a receive signal after a reflection of the microwave signal inside the container;
    generating an analysis curve on the basis of at least the receive signal, wherein the analysis curve is generated such that a signal strength of the receive signal is reproduced as a function of a measuring distance;
    dividing a measurement region of the analysis curve into a near region, a middle region, and a far region;
    detecting an area under the analysis curve within the far measurement region;
    ascertaining a change and/or a dispersion of the detected area over proceeding measurement cycles; and
    detecting the foaming when the change or the dispersion of the detected area exceeds or undershoots a specified threshold.

2. A radar-based fill-level measuring device for measuring a fill level of a filling material in a container, the fill-level measuring device comprising:
    a signal generating unit designed to respectively emit a microwave signal in a direction of the filling material in successive measurement cycles;
    a receiving unit designed to receive a receive signal after reflection of the microwave signal inside the container; and
    an evaluation unit designed:
        to generate, on the basis of at least the receive signal, per measurement cycle, an analysis curve representing a signal strength of the receive signal as a function of the measuring distance;
        to divide a measurement region of the analysis curve into a near region, a middle region, and a far region;
        to detect an area under the analysis curve within the far measurement region;
        to ascertain a change and/or a dispersion of the detected area over proceeding measurement cycles;
        to detect a foaming of the filling material when the change or dispersion of the detected area exceeds or undershoots a specified threshold; and
        to determine the fill level via the analysis curve at least when the change or dispersion does not exceed or undershoot the specified threshold.

3. The fill-level measuring device according to claim 2, wherein the evaluation unit is designed to output the occurrence of the foaming graphically or as an electrical signal.

* * * * *